United States Patent
Beals et al.

(10) Patent No.: US 11,082,726 B2
(45) Date of Patent: Aug. 3, 2021

(54) REMOTELY GENERATED ENCODING METADATA FOR LOCAL CONTENT ENCODING

(71) Applicant: DISH Network L.L.C., Englewood, CO (US)

(72) Inventors: William Michael Beals, Englewood, CO (US); Alistair Chatwin, Highlands Ranch, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 17/030,133

(22) Filed: Sep. 23, 2020

(65) Prior Publication Data

US 2021/0006843 A1     Jan. 7, 2021

Related U.S. Application Data

(63) Continuation of application No. 15/857,269, filed on Dec. 28, 2017, now Pat. No. 10,820,023.

(51) Int. Cl.
| | |
|---|---|
| *H04N 7/20* | (2006.01) |
| *H04N 21/235* | (2011.01) |
| *H04N 21/2343* | (2011.01) |
| *H04N 21/61* | (2011.01) |
| *H04N 21/233* | (2011.01) |
| *H04N 19/517* | (2014.01) |

(52) U.S. Cl.
CPC ..... *H04N 21/2353* (2013.01); *H04N 21/2335* (2013.01); *H04N 21/2343* (2013.01); *H04N 21/6143* (2013.01); *H04N 21/6193* (2013.01); *H04N 19/517* (2014.11)

(58) Field of Classification Search
CPC .......... H04N 21/2353; H04N 21/2343; H04N 21/6143; H04N 21/6193; H04N 21/2335; H04N 19/517; H04N 19/513; H04N 19/46; H04N 19/40
USPC ......................................................... 725/64
See application file for complete search history.

(56) References Cited

U.S. PATENT DOCUMENTS

| | | | | |
|---|---|---|---|---|
| 5,784,683 | A * | 7/1998 | Sistanizadeh | H04L 65/4076 348/E7.051 |
| 5,835,128 | A * | 11/1998 | Macdonald | H04N 7/20 725/81 |
| 7,990,332 | B1 | 8/2011 | Tischer | |
| 8,832,743 | B2 | 9/2014 | Kummer | |
| 9,124,933 | B1 * | 9/2015 | Lee | H04N 21/6112 |
| 9,148,693 | B1 | 9/2015 | Jupin et al. | |

(Continued)

*Primary Examiner* — Jefferey F Harold
*Assistant Examiner* — Sahar Aqil Riaz
(74) *Attorney, Agent, or Firm* — Seed IP Law Group LLP

(57) ABSTRACT

Embodiments are directed towards remotely generating encoding metadata at a remote content distributor for use by a local user computing device. The remote content distributor receives and encodes content. During or after the encoding process, the remote content distributor generates encoding metadata that indicates how the content was encoded by the remote content distributor. The remote content distributor provides the encoding metadata to the user computer device. The user computing device receives the content and the encoding metadata and encodes the content based on the encoding metadata. The user computing device can then provide the encoded content to another computing device for decoding and presentation to a user.

20 Claims, 6 Drawing Sheets

(56) References Cited

U.S. PATENT DOCUMENTS

| | | |
|---|---|---|
| 9,420,329 B2 | 8/2016 | Majid |
| 9,756,290 B2 | 9/2017 | Pham et al. |
| 10,165,312 B2 * | 12/2018 | Petruzzelli ............. H04H 20/02 |
| 2002/0073437 A1 * | 6/2002 | Chang .................. H04B 7/0408 |
| | | 725/143 |
| 2003/0217362 A1 | 11/2003 | Summers et al. |
| 2005/0251843 A1 | 11/2005 | Walker |
| 2006/0039473 A1 | 2/2006 | Filippini et al. |
| 2009/0144773 A1 | 6/2009 | Cavanaugh et al. |
| 2009/0228930 A1 | 9/2009 | Luu et al. |
| 2010/0218228 A1 | 8/2010 | Walter |
| 2010/0228876 A1 | 9/2010 | Dankberg |
| 2011/0271092 A1 | 11/2011 | Brelay et al. |
| 2012/0253941 A1 | 10/2012 | van Bemmel |
| 2013/0243397 A1 | 9/2013 | Minnick et al. |
| 2013/0286960 A1 | 10/2013 | Li et al. |
| 2015/0127775 A1 | 5/2015 | Munagala et al. |
| 2015/0181272 A1 | 6/2015 | Lu et al. |
| 2015/0200440 A1 * | 7/2015 | David .................... H01Q 1/125 |
| | | 725/72 |
| 2015/0230004 A1 | 8/2015 | VanDuyn et al. |
| 2015/0282003 A1 | 10/2015 | Noerpel et al. |
| 2015/0301788 A1 | 10/2015 | Johnston et al. |
| 2016/0119665 A1 | 4/2016 | Grant |
| 2016/0191145 A1 | 6/2016 | Fang et al. |
| 2016/0316269 A1 | 10/2016 | Parker |
| 2017/0085328 A1 | 3/2017 | Dickemann, Jr. et al. |
| 2017/0099514 A1 | 4/2017 | Wodka et al. |
| 2017/0171586 A1 | 6/2017 | Sartori et al. |
| 2017/0201776 A1 * | 7/2017 | Petruzzelli ......... H04N 21/2385 |
| 2017/0238032 A1 | 8/2017 | Casavant et al. |
| 2017/0318353 A1 | 11/2017 | Petruzzelli et al. |
| 2017/0339200 A1 | 11/2017 | Roy et al. |
| 2018/0220265 A1 | 8/2018 | Helms et al. |
| 2018/0234726 A1 | 8/2018 | Allstead, Jr. et al. |
| 2018/0359506 A1 * | 12/2018 | Hodge ............... H04N 21/2402 |

* cited by examiner

REMOTELY GENERATED ENCODING METADATA FOR LOCAL CONTENT ENCODING

TECHNICAL FIELD

The present disclosure relates generally to providing audiovisual content to a user and, more particularly, to remotely generating encoding metadata for content for use to locally encode the content.

BACKGROUND

Description of the Related Art

Prior to transmitting content from a content distributor to a content receiver, the content distributor typically encodes the content to reduce the amount of data that has to be transmitted to the content receiver. For example, the content distributor may encode the content into an MPEG-4 format that compresses and reduces the number of bytes utilized to represent each image frame in the content. Such encoding often compares subsequent image frames to identify differences between a first frame and a second frame. These differences can then be used to define the second frame based on the data that defines the first frame, which can reduce the amount of data need to define the second frame. More complex encoding schemes or mechanisms can even compare multiple frames and define changes among a group of frames. However, such encoding mechanisms typically utilize large amounts of memory and computer processing power to determine the most efficient way to compress the data, which makes it difficult for smaller local content receivers to perform the same types of encoding, such as when transmitting content to a mobile computing device. It is with respect to these and other considerations that the embodiments described herein have been made.

BRIEF SUMMARY

Briefly described, embodiments are directed toward systems and methods of generating encoding metadata at a content distributor and providing the encoding metadata to a user computing device, such as a local content-receiver-and-distribution device, for use by the user computing device to encode content without having to analyze the content to determine how to encode the content. In this way, the user computing device can encode the content in an efficient manner determined by the content distributor.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
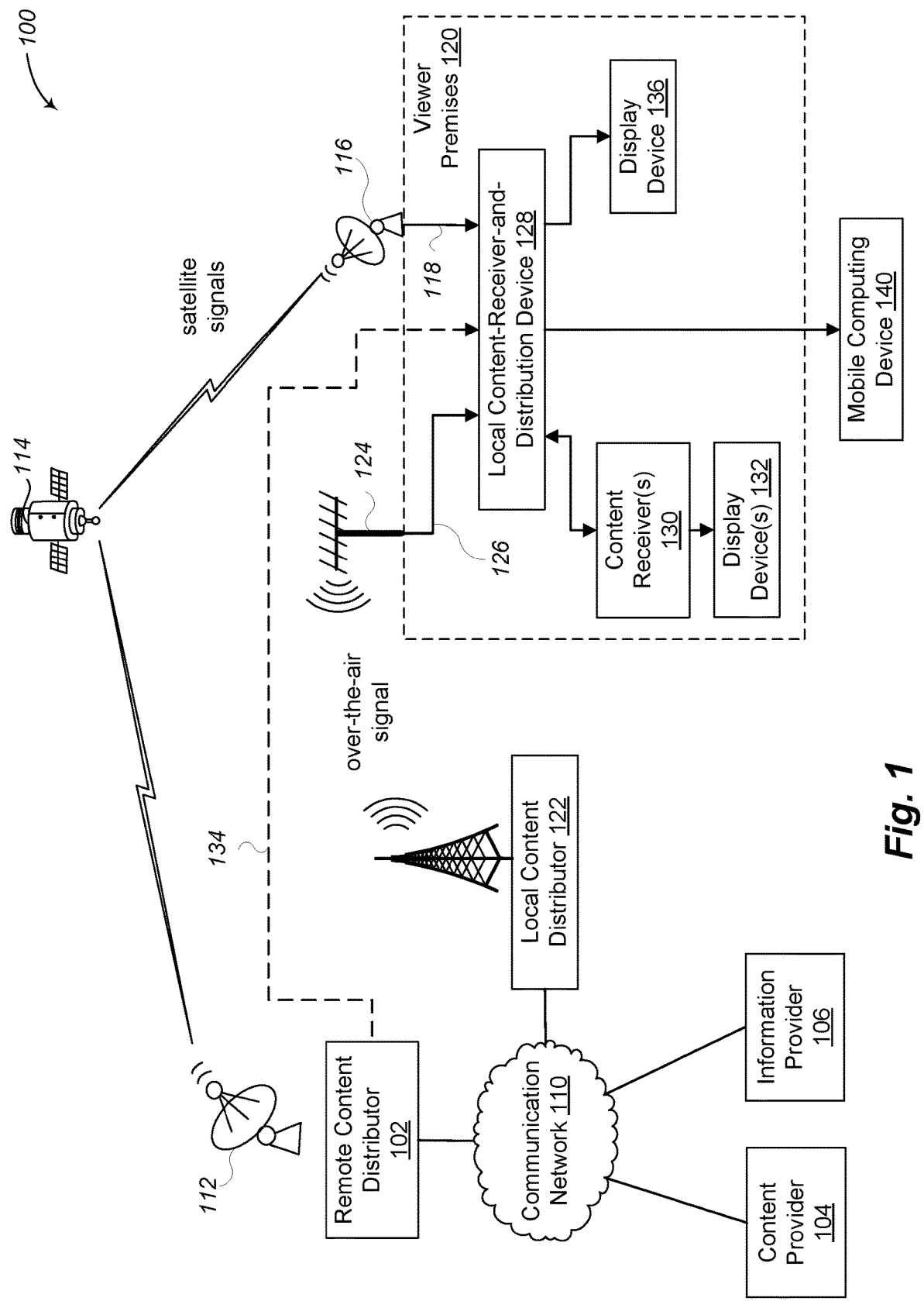
FIG. 1 illustrates a context diagram of an environment for providing content to viewers in accordance with embodiments described herein.

FIG. 1 shows a context diagram of one embodiment of an environment 100 for providing content to a viewer in accordance with embodiments described herein. Environment 100 includes viewer premises 120, remote content distributor(s) 102 and local content distributor(s) 122.

Viewer premises 120 may be referred to as a location that is local to the user, such as the user's home, apartment, hotel, etc. The viewer premises 120 includes a local content-receiver-and-distribution device 128, a satellite antenna 116, and an over-the-air antenna 124. Orbital signals received via the satellite antenna 116 are provided to local content-receiver-and-distribution device 128 via communication link 118. And over-the-air signals received via the over-the-air antenna 124 are provided to the local content-receiver-and-distribution device 128 via communication link 126. In various embodiments, "orbital signals" and "orbital television signals" are satellite orbital television signals that include audiovisual content and are transmitted from a satellite to a satellite antenna.

The local content-receiver-and-distribution device 128 is a computing device that receives content and can perform various actions on the content as described herein. In various embodiments, the local content-receiver-and-distribution device 128 is a set-top box, a cable connection box, a computer, television receiver, or other content receiver.

As described in more detail below, the remote content distributor 102, or the local content distributor 122, encodes or otherwise transcodes the same content that will also be received by the local content-receiver-and-distribution device 128. The remote content distributor 102 generates encoding metadata, or transcoding metadata, that provides information as to how the content was encoded or transcoded by the remote content distributor 102. For example, the encoding metadata includes information identifying how groups of pictures are generated, where anchor frames are located, distance between two full images, motion vector estimation information, stat-mux data, or other types of hinting information. In various embodiments, the encoding metadata does not include encryption keys or other encryption data that is used to secure the content being provided from the remote content distributor 102 to the local content-receiver-and-distribution device 128. However, in some embodiments, the encoding metadata itself may be encrypted or secured so that only the local content-receiver-and-distribution device 128 can access the encoding metadata.

The remote content distributor 102 provides the encoding metadata to the local content-receiver-and-distribution device 128 via link 134, which may be via the Internet or some other wired or wireless network connection, or via a spot beam signal or other orbital signal that is sent via uplink antenna 112 to satellite 114 for transmission to satellite antenna 116. The terms "spot beam" and "spot beam signal" refer to an orbital signal that is generated for and transmitted to a specific geographical area. A spot beam signal typically includes audiovisual content for channels that are local to that specific geographical area. The terms "other orbital signals" and "other orbital television signals" refer to one or more orbital signals that accompany the spot beam signal. The other orbital signals typically include audiovisual content for non-local channels or on-demand content.

The local content-receiver-and-distribution device 128 receives, via the satellite antenna 116 or the over-the-air antenna 124, the same content that was encoded by the remote content distributor 102. When the local content-receiver-and-distribution device 128 receives the encoding metadata from the remote content distributor 102, the local content-receiver-and-distribution device 128 encodes the content based on the encoding metadata. Since the local content-receiver-and-distribution device 128 received the encoding metadata from the remote content distributor 102, the local content-receiver-and-distribution device 128 can utilize the encoding metadata to re-encode the content in the same way that the remote content distributor 102 encoded the data without having to analyze the content to determine how to encode the content.

It should be recognized that one or more signals (e.g., the encoding metadata or encoded content) being sent from the remote content distributor 102 to the local content-receiver-and-distribution device 128 may be encrypted. Accordingly, the local content-receiver-and-distribution device 128 may have to unencrypt the received signals before extracting the encoding metadata, or decoding the received encoded content if provided to the local content-receiver-and-distribution device 128.

In some embodiments, as discussed in more detail below in conjunction with FIG. 2, the remote content distributor 102 provides the encoded content and the encoding metadata to the local content-receiver-and-distribution device 128, such as via separate data streams or data communication channels. The local content-receiver-and-distribution device 128 then decodes and re-encodes the content based on the received encoding metadata.

In other embodiments, as discussed in more detail below in conjunction with FIG. 3, both the remote content distributor 102 and the local content-receiver-and-distribution device 128 receive the content at relatively the same time via over-the-air signals from the local content distributor 122. The remote content distributor 102 encodes the content and generates the encoding metadata, but only provides the encoding metadata, and not the encoded content, to the local content-receiver-and-distribution device 128. The local content-receiver-and-distribution device 128 stores the content received via the over-the-air signals and encodes it when the local content-receiver-and-distribution device 128 receives the encoding metadata from the remote content distributor 102.

The local content-receiver-and-distribution device 128 can then provide the encoded content to another computing device, such as one or more content receivers 130 or mobile computing device 140. In some embodiments, the local content-receiver-and-distribution device 128 provides the encoded content to one or more content receivers 130 to be decoded and presented to a user via display devices 132. In other embodiments, the local content-receiver-and-distribution device 128 provides the encoded content to a device that is remote to the viewer's premises 120, such as mobile computing device 140, which decodes the encoded content and displays it to a user. In yet other embodiments, the local content-receiver-and-distribution device 128 can display the content on a local display device 136.

Since the remote content distributor 102 typically has more computing power than the spot local content-receiver-and-distribution device 128, it can more efficiently compress and encode the original content than the local content-receiver-and-distribution device 128. Accordingly, the remote content distributor 102 includes a computation intensive, or "expensive," encoder and the content-receiver-and-distribution device 128 includes a much less computation intensive, or "inexpensive," encoder, which allows the local content-receiver-and-distribution device 128 to save computing resources by not trying to figure out how to encode the received local content and can just apply the encoding metadata that was received from the remote content distributor 102. As a result, embodiments described herein provide the benefit of the local content-receiver-and-distribution device 128 encoding content just as efficiently as performed by the remote content distributor 102. Similarly, utilizing a primary encoder at the remote content distributor 102 potentially reduces the cost of each local content-receiver-and-distribution device 128, which can save money over potentially thousands of local content-receiver-and-distribution devices 128 being employed. An additional benefit is provided in embodiments where the remote content distributor 102 does not re-transmit the local content to the local content-receiver-and-distribution device 128 via the satellite 114, but rather provides the encoding metadata for the local content-receiver-and-distribution device 128 to utilize on locally received over-the-air signals.

In various embodiments, the content receivers 130 are computing devices that receive satellite signals or the encoded content from the local content-receiver-and-distribution device 128 and extract or decode audiovisual content therefrom for presentation on respective display devices 132. Examples of content receivers 130 include, but are not limited to, a set-top box, a cable connection box, a computer, television receiver, radio receiver, or other content receivers. The display devices 132 or display device 136 may be any kind of visual content display device, such as, but not limited to, a television, monitor, projector, or other display device. Although not illustrated, content receivers 130 may also provide audio content to separate audio output devices.

As mentioned above, the viewer premises 120 receives over-the-air signals from the local content distributor 122 and orbital signals from the remote content distributor 102. The local content distributor 122 transmits over-the-air signals with local television programming for location-specific television channels. Examples of local television programming channels include, but are not limited to, ABC, CBS, NBC, FOX, PBS and CW. The remote content distributor 102 transmits other orbital signals with programming content for other, non-local channels and content. For example, the other orbital signals may include on-demand content, premium channel content (e.g., HBO, Showtime, NFL Network, etc.), or other subscription-based channels (e.g., TBS, ESPN, HGTV, etc.).

The remote content distributor 102 and the local content distributor 122 receive the programming content to distribute from one or more content providers 104, one or more information providers 106, or a combination thereof. Typically, content providers 104 generate, aggregate, and/or otherwise provide audiovisual content, which may include movies, sitcoms, reality shows, talk shows, game shows, documentaries, infomercials, news programs, sports broadcasts, commercials, advertisements, or the like. Information provider 106 may create and distribute data or other information that describes or supports audiovisual content, such as program name, closed caption authoring, and placement within the content, time slot data, pay per view and related data, or other information that is associated with the content. The remote content distributor 102 uplinks content to the satellite 114 via uplink antenna, and the satellite 114 transmits the content to the local content-receiver-and-distribution device 128 via satellite antenna 116. The local content distributor 122 provides the content to the local content-receiver-and-distribution device 128 via over-the-air signals, which are received via over-the-air antenna 124.

In various embodiments, content providers 104, information provider 106, remote content distributor 102, and local content distributor 122 communicate with each other via communication network 110. Communication network 110 may be configured to couple various computing devices to transmit content/data from one or more computing devices to one or more other computing devices. For example, communication network 110 may be the Internet, X.25 networks, or a series of smaller or private connected networks that carry the content and other data. Communication network 110 may include one or more wired or wireless networks.

Figure 2:
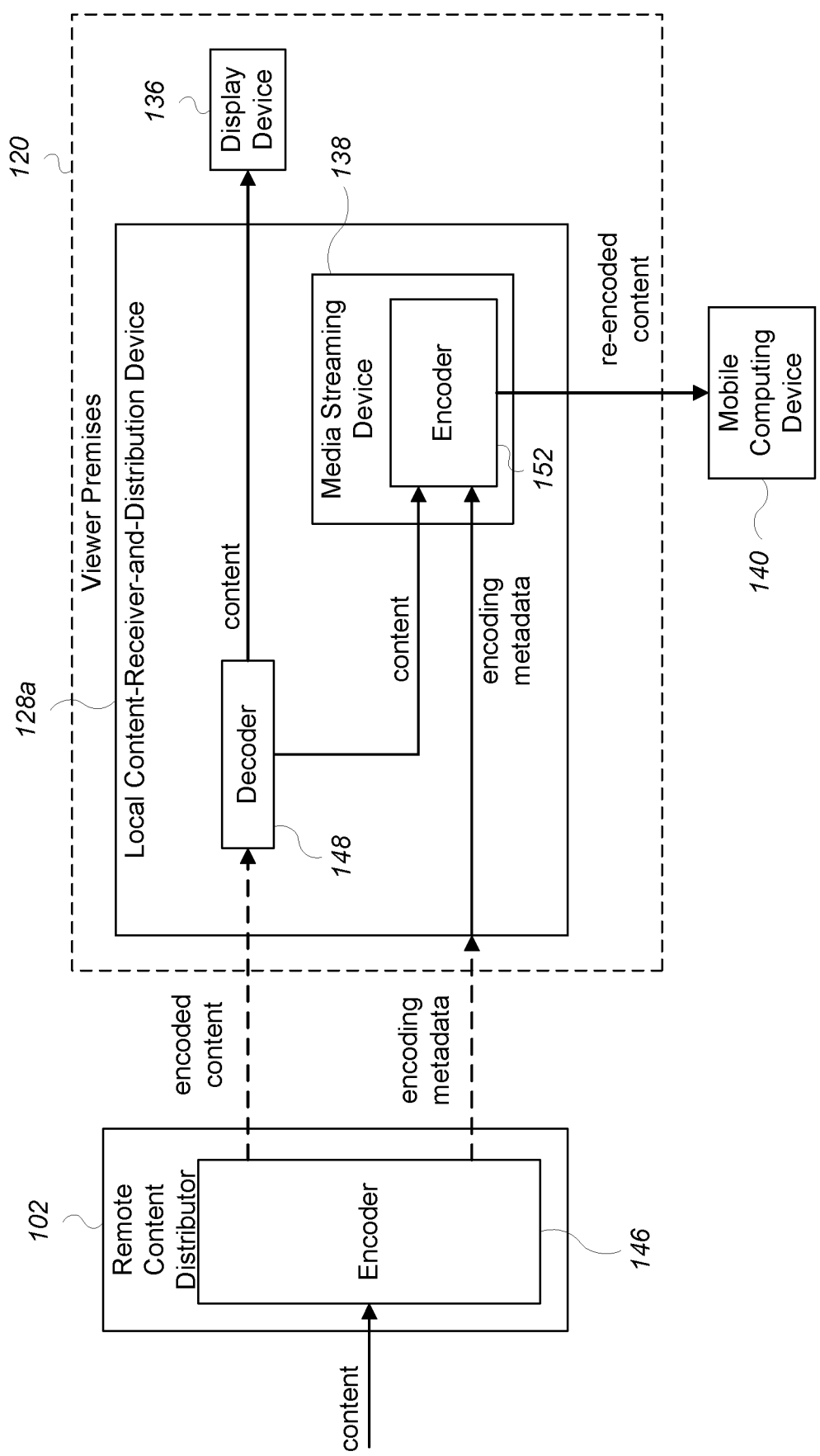
FIGS. 2 and 3 are context diagrams of non-limiting embodiments of systems for providing encoding metadata from a content distributor to a content-receiver-and-distribution device for encoding content to distribute to another computing device for decoding and presenting to a user in accordance with embodiments described herein.

FIG. 2 is a context diagram of a non-limiting embodiment of systems for providing encoding metadata from a content distributor to a content-receiver-and-distribution device for encoding content to distribute to another computing device in accordance with embodiments described herein. As briefly mentioned above, in some embodiments, the remote content distributor 102 provides the encoded content and the encoding metadata to the local content-receiver-and-distribution device 128. The local content-receiver-and-distribution device 128 then decodes and re-encodes the content based on the received encoding metadata.

In this illustrated example, the remote content distributor 102 receives content. The content may be received via over-the-air television signals, such as local content distributor 122 in FIG. 1, or it may be received from one or more content providers 104 or information providers 106 in FIG. 1. The received content is provided to an encoder 146, which encodes the content to create encoded content. While encoding the content, the encoder 146 also generates encoding metadata describing how the encoder 146 is encoding the content.

The remote content distributor 102 transmits the encoded content and the encoding metadata to a local content-receiver-and-distribution device 128a on the viewer's premises 120. The local content-receiver-and-distribution device 128a is one embodiment of the local content-receiver-and-distribution device 128 described above in conjunction with FIG. 1. In various embodiments, the encoded content and the encoding metadata may be transmitted via separate data streams or signals, separate communication channels, different communication channels, or as a multiplexed or otherwise combined data stream or signal. As mentioned above, the remote content distributor 102 may transmit the encoded content or the encoding metadata, or both, to the local content-receiver-and-distribution device 128a via a satellite connection or via other terrestrial wired or wireless communication networks.

The local content-receiver-and-distribution device 128a includes a decoder 148 and media streaming device 138. In this example, the decoder 148 decodes the received encoded content for presentation on display device 136. The decoded content is also provided to media streaming device 138.

The media streaming device 138 includes an encoder 152 that receives the content from the decoder 148 and the encoding metadata from the remote content distributor 102. The encoder 152 uses the encoding metadata to re-encode the content. Once re-encoded, the media streaming device 138 transmits the re-encoded content to a mobile computing device 140 for presentation to the user. In some embodiments, mobile computing device 140 is a smart phone, tablet computer, laptop computer, or other mobile computing device that can decode the re-encoded content and present it to the user. In some other embodiments, the media streaming device 138 can transmit the re-encoded content to other computing devices, such as laptop computers, remote content receivers, or other non-mobile computing devices.

Although the local content-receiver-and-distribution device 128a is illustrated as including the media streaming device 138, embodiments are not so limited. For example, in some embodiments, the local content-receiver-and-distribution device 128a is a standalone content receiver (e.g., a set-top box) and the media streaming device is a separate standalone television streaming media device (e.g., a sling box). In such an embodiment, the local content-receiver-and-distribution device 128a may receive the encoding metadata from the remote content distributor 102 and forward it to the media streaming device 138, or the streaming media device may receive the encoding metadata from the remote content distributor 102 without going through the local content-receiver-and-distribution device 128a.

Figure 3:
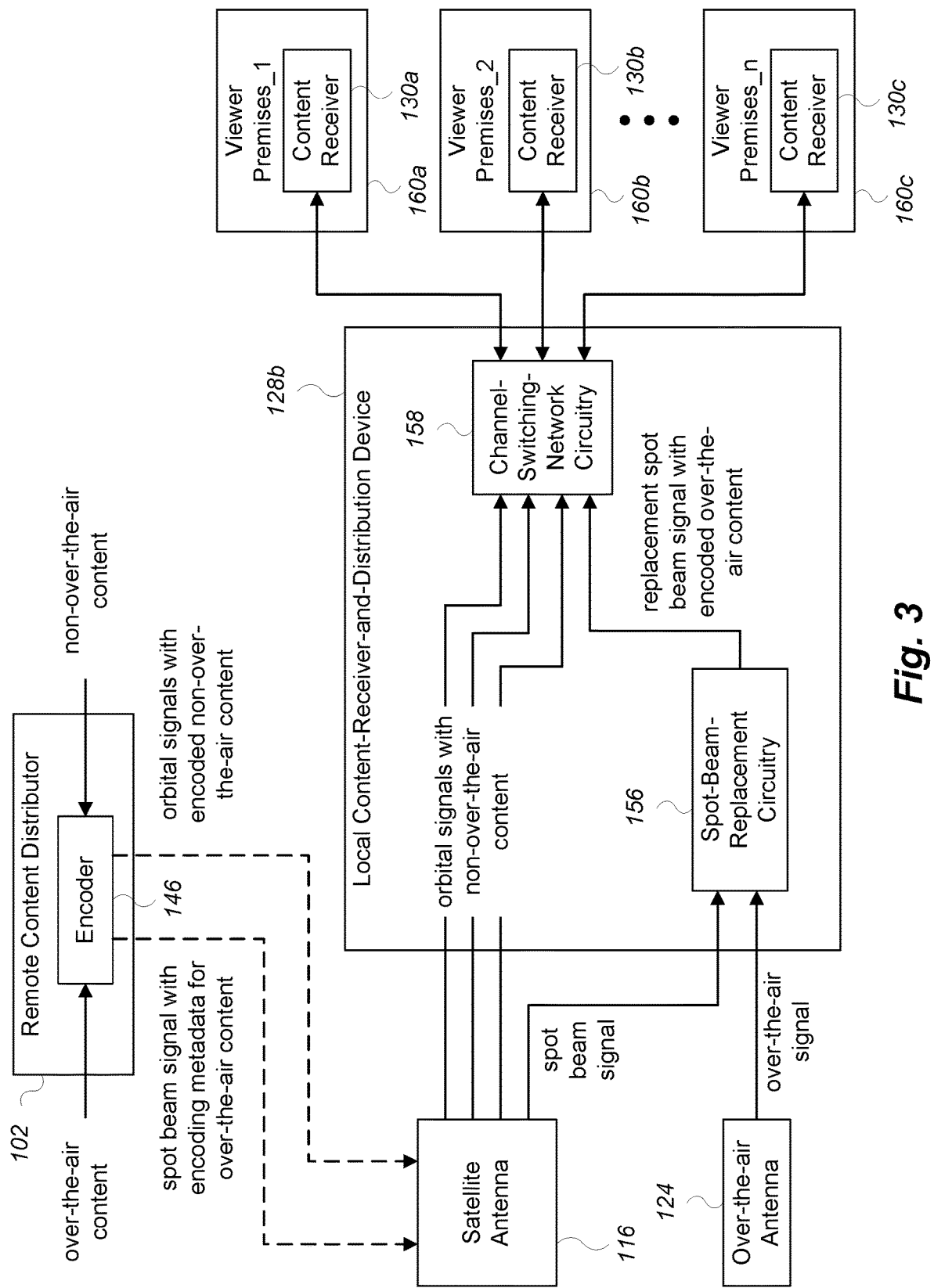

FIG. 3 is a context diagram of another non-limiting embodiment of systems for providing encoding metadata from a content distributor to a content-receiver-and-distribution device for encoding content to distribute to another computing device in accordance with embodiments described herein. As briefly mentioned above, in some embodiments, both the remote content distributor 102 and the local content-receiver-and-distribution device 128 receive the over-the-air content. The remote content distributor 102 encodes the content and generates the encoding metadata, but only provides the encoding metadata, and not the encoded content, to the local content-receiver-and-distribution device 128.

In this illustrated example, the remote content distributor 102 receives over-the-air content and non-over-the-air content. The over-the-air content is received via an over-the-air antenna (not illustrated) from local content distributor 122 in FIG. 1. The non-over-the-air content is received from one or more content providers 104 or information providers 106 in FIG. 1. The remote content distributor 102 provides the received content to an encoder 146, which encodes the over-the-air content to create encoded over-the-air content and encodes the non-over-the-air content to create encoded non-over-the-air content. While encoding the over-the-air content, the encoder 146 also generates encoding metadata describing how the encoder 146 encoded the over-the-air content.

The remote content distributor 102 also includes other circuitry (not illustrated) to generate orbital signals from the encoded content. The remote content distributor 102 generates a spot beam signal with the encoding metadata for the over-the-air content. In some embodiments, the spot beam signal includes the encoded over-the-air content, while in other embodiments the spot beam signal does not include the encoded over-the-air content. The remote content distributor 102 also generates one or more orbital signals with the encoded non-over-the-air content. The spot beam signal and the one or more orbital signals are received by a local content-receiver-and-distribution device 128b via satellite antenna 116. The local content-receiver-and-distribution device 128b is an embodiment of the local content-receiver-and-distribution device 128 in FIG. 1.

The local content-receiver-and-distribution device 128 includes spot-beam-replacement circuitry 156 and channel-switching-network circuitry 158. The spot-beam-replacement circuitry 156 receives the spot beam signal from the satellite antenna 116 and one or more over-the-air signals from the over-the-air antenna 124. These over-the-air signals include the same over-the-air content that was received by the remote content distributor 102. In various embodiments, the local content-receiver-and-distribution device 128b extracts the content from the received over-the-air signals and stores it until it receives the encoding metadata from the remote content distributor 102 via the spot beam signal. When the spot beam signal is received via the satellite antenna 116, the spot-beam-replacement circuitry 156 ignores the encoded over-the-air content, if present, and generates a replacement spot beam signal by converting the over-the-air television signals into a satellite-compliant signal.

As described herein, the spot beam signal includes the encoding metadata. In some embodiments, the spot beam signal may include additional data, such as information identifying the local channels that are expected to be broadcast via over-the-air television signals in the specific geographical area of the local content-receiver-and-distribution device 128b, data tables that identify other characteristics or attributes of the other orbital television signals that accompany the spot beam signal, or other information.

The spot-beam-replacement circuitry 156 analyzes the spot beam signal to extract the encoding metadata and to determine one or more local channels that are expected to be included in the spot beam signal. The spot-beam-replacement circuitry 156 also analyzes the received over-the-air signals to determine which of the expected local channels are available in the over-the-air signals and extracts the available channels from the over-the-air signals.

The spot-beam-replacement circuitry 156 then encodes the extracted available channels based on the encoding metadata that was extracted from the spot beam signal. The spot-beam-replacement circuitry 156 then modulates the encoded signal with one or more spot beam modulation parameters and up-converts the modulated signal to the transponder frequency of the original spot beam signal.

The replacement spot beam signal is provided to the channel-switching-network circuitry 158. The channel-switching-network circuitry 158 also receives one or more other orbital signals from the satellite antenna 116. The channel-switching-network circuitry 158 combines the replacement spot beam signal with the one or more other orbital signals for distribution to content receivers 130a-130c on viewer premises 160a-160c, respectively. In some embodiments, the content receivers 130a-130c communicate with the channel-switching-network circuitry 158 to request specific channels in the replacement spot beam or in the other orbital signals. The channel-switching-network circuitry 158 selects the orbital signal or replacement spot beam signal associated with the requested channel and provides that signal to the requesting content receiver.

In some embodiments, the spot-beam-replacement circuitry 156 may also provide the encoding metadata to the channel-switching-network circuitry 158 for forwarding to the content receivers 130. In this way, the content receivers 130 may perform functionality similar to the local content-receiver-and-distribution device 128a in FIG. 2 to decode the over-the-air content, re-encode the over-the-air content using the encoding metadata, and transmit the re-encoded over-the-air content to a remote mobile computing device.

In some other embodiments, the encoder 146 of the remote content distributor 102 may also generate encoding metadata indicating how the encoder 146 encoded the non-over-the-air content. This additional encoding metadata may be included in or with the other orbital signals. The channel-switching-network circuitry 158 can then forward this additional encoding metadata to the content receivers 130 for re-encoding the non-over-the-air content. In this way, the content receivers 130 may perform functionality similar to the local content-receiver-and-distribution device 128a in FIG. 2 to decode the non-over-the-air content, re-encode the non-over-the-air content using the additional encoding metadata, and transmit the re-encoded non-over-the-air content to a remote mobile computing device.

The operation of certain aspects will now be described with respect to FIGS. 4 and 5. In at least one of various embodiments, process 170 described in conjunction with FIG. 4 may be implemented by or executed via circuitry or on one or more computing devices, such as remote content distributor 102 in FIG. 1; and process 180 described in conjunction with FIG. 5 may be implemented by or executed via circuitry or on one or more other computing devices, such as local content-receiver-and-distribution device 128 in FIG. 1, local content-receiver-and-distribution device 128a in FIG. 2, or local content-receiver-and-distribution device 128*b* in FIG. 3, collectively referred to as local content-receiver-and-distribution device.

Figure 4:
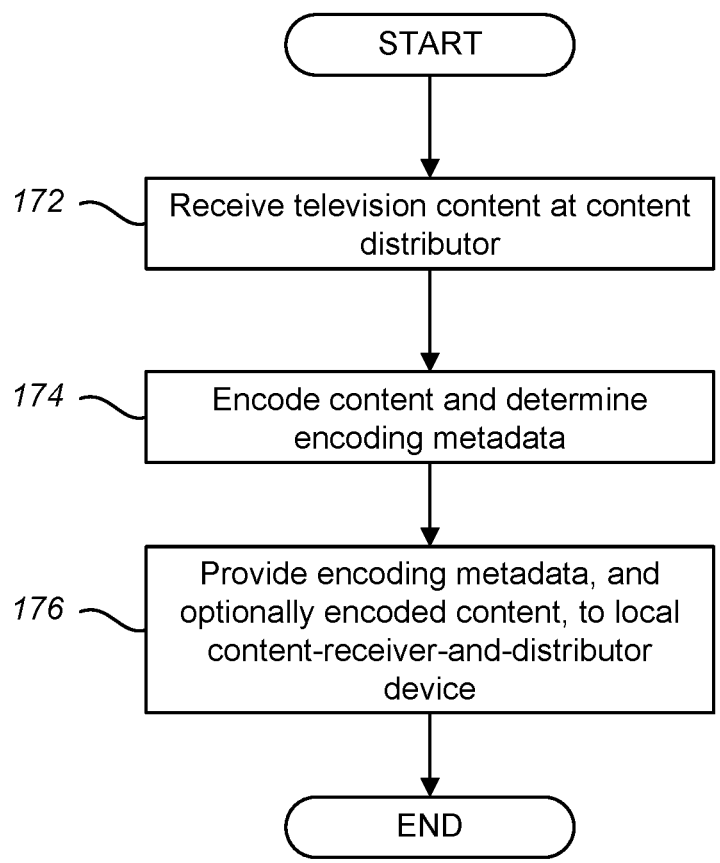
FIG. 4 illustrates a logical flow diagram showing one embodiment of an overview process for generating encoding metadata by content distributor in accordance with embodiments described herein.

FIG. 4 illustrates a logical flow diagram showing one embodiment of an overview process 170 for generating encoding metadata by the content distributor in accordance with embodiments described herein. Process 170 begins, after a start block, at block 172, where television content is received at the content distributor, such as remote content distributor 102 in FIG. 1. As discussed above, the content may be over-the-air content or non-over-the-air content.

Process 170 proceeds to block 174, where the content is encoded and encoding metadata is determined. The encoding may be any of a variety of encoding mechanisms that compress, reduce, or otherwise alter the format of the content for distribution from the content distributor to a local content-receiver-and-distribution device. While encoding the content, encoding metadata is generated to describe how the content is being encoded. This encoding metadata includes information identifying how groups of pictures are generated, where anchor frames are located, distance between two full images, motion vector estimation information, stat-mux data, or other types of hinting information that instructs another computing device how to efficiently encode the content.

Process 170 continues at block 176, where the encoding metadata is provided to a local content-receiver-and-distribution device. In some embodiments, the encoded content is also provided to the local content-receiver-and-distribution device. As described above, the encoding metadata may be provided from the content distributor to the local content-receiver-and-distribution device via a satellite orbital signal, such as a spot beam signal, or via other terrestrial wired or wireless communication networks. After block 176, process 170 terminates or otherwise returns to a calling process to perform other actions.

Although the above process is described linearly, embodiments are not so limited, rather the content distributor may continuously, in real time or near real time, generate encoding metadata and provide it to the local content-receiver-and-distribution device while additional content is being received by the content distributor. Moreover, in some embodiments, content received by the content distributor may have been previously encoded to transmit the content to the content distributor. In which case, the content distributor decodes the previously encoded content into an uncompressed format, which is referred to herein as the content or the unencoded content.

Figure 5:
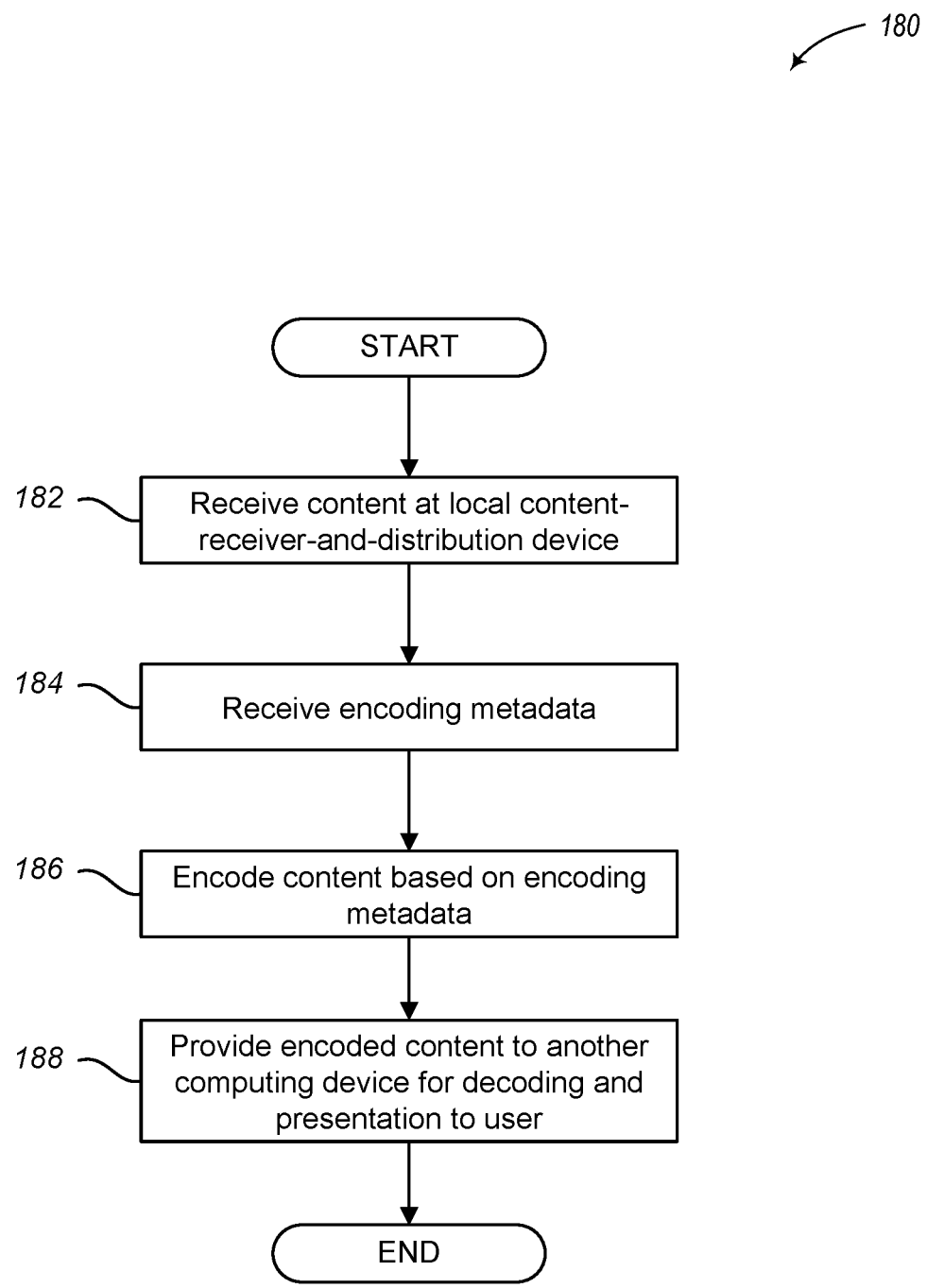
FIG. 5 illustrates a logical flow diagram showing one embodiment of a process for receiving encoding metadata at a content-receiver-and-distribution device and encoding content based on the encoding metadata in accordance with embodiments described herein.

FIG. 5 illustrates a logical flow diagram one embodiment of a process 180 for receiving encoding metadata at a local content-receiver-and-distribution device and encoding content based on the encoding metadata in accordance with embodiments described herein. Process 180 begins, after a start block, at block 182, where content is received at the local content-receiver-and-distribution device. In various embodiments, the content is received from a content distributor, such as local content distributor 122 or remote content distributor 102.

Process 180, proceeds to block 184, where encoding metadata is received from the content distributor. As described herein, the encoding metadata is information identifying how the content distributor encoded the content, regardless of whether or not the content distributor provided the encoded content to the local content-receiver-and-distribution device.

Process 180 continues at block 186, where the content is encoded based on the encoding metadata. For example, in some embodiments, the content is encoded based on the encoding metadata by using motion vector estimation information included in the encoding metadata. In other embodiments, the content is encoded based on the encoding metadata by using the location of the anchor frames in the content to generate the encoded content. In another example, the content is encoded based on the encoding metadata by using the information that defines how each of the plurality of groups of pictures is generated to generate the encoded content from the content. In yet other embodiments, other types of encoding hinting information generated by the content distributor while also encoding the content may be used by the local content-receiver-and-distribution device to encode the content.

Process 180 proceeds next to block 188, where the encoded content is provided, transmitted, or otherwise sent to another computing device for decoding and presentation to a user. As described above, in some embodiments, the encoded content may be provided to one or a plurality of content receivers as a replacement spot beam. In other embodiments, the encoded content may be provided to mobile computing device of the user. After block 188, process 180 terminates or otherwise returns to a calling process to perform other actions.

Although the above process is described linearly, embodiments are not so limited, rather the local content-receiver-and-distribution device may continuously, in real time or near real time, receive content and encoding metadata and encode the content while additional content and encoding metadata is being received by the local content-receiver-and-distribution device. Moreover, as described above, in some embodiments, content received by the local content-receiver-and-distribution device may have been previously encoded to transmit the content to the local content-receiver-and-distribution device. In which case, the local content-receiver-and-distribution device decodes the previously encoded content into an uncompressed format, prior to encoding the content based on the encoding metadata. The format of the content prior to encoding by the local content-receiver-and-distribution device is the same format as the content used by the content distributor to generate the encoding metadata.

Figure 6:
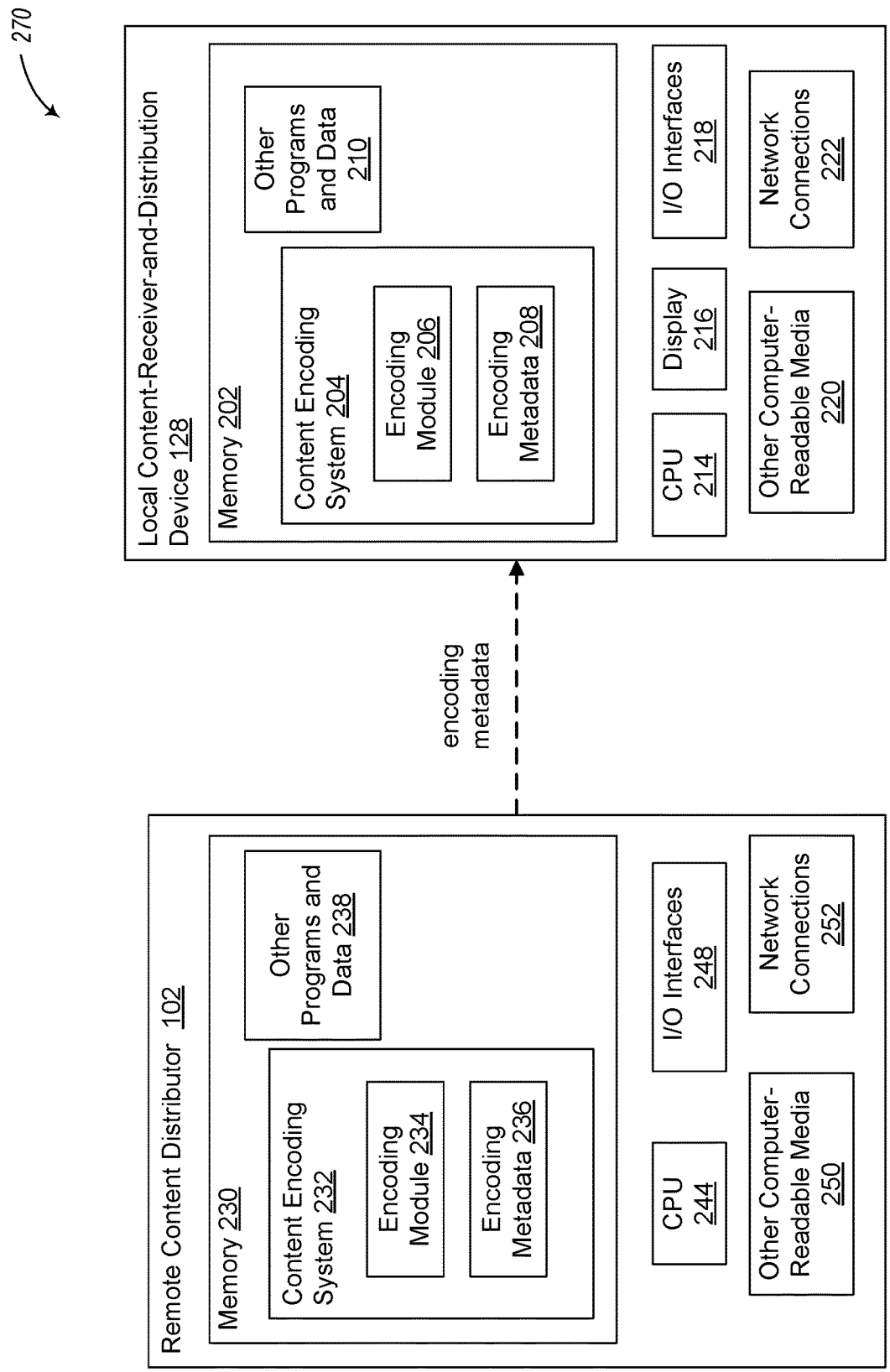
FIG. 6 shows a system diagram that describe various implementations of computing systems for implementing embodiments described herein.

FIG. 6 shows a system diagram that describes one implementation of computing systems for implementing embodiments described herein. System 270 includes remote content distributor 102 and local content-receiver-and-distribution device 128.

Remote content distributor 102 generates and provides the encoding metadata to the local content-receiver-and-distribution device 128. In general, the remote content distributor 102 encodes content and generates encoding metadata that defines how the content was encoded. The remote content distributor 102 then provides the encoding metadata to the local content-receiver-and-distribution device 128. In some embodiments, the remote content distributor 102 also provides the encoded content to the local content-receiver-and-distribution device 128 for presentation to a user or to transmit to another computing device. One or more special-purpose computing systems may be used to implement remote content distributor 102. Accordingly, various embodiments described herein may be implemented in software, hardware, firmware, or in some combination thereof. Remote content distributor 102 may include memory 230, one or more central processing units (CPUs) 244, I/O interfaces 248, other computer-readable media 250, and network connections 252.

Memory 230 may include one or more various types of non-volatile and/or volatile storage technologies. Examples of memory 230 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 230 may be utilized to store information, including computer-readable instructions that are utilized by CPU 244 to perform actions, including embodiments described herein.

Memory 230 may have stored thereon content encoding system 232, which includes encoding module 234 and encoding metadata 236. The encoding module 234 may employ embodiments described herein to encode content and generate encoding metadata, such as encoder 146 in FIG. 2. The encoding metadata 236 may temporarily store the generated encoding metadata prior to transmission to the local content-receiver-and-distribution device 128. Memory 230 may also store other programs and data 238, which may include other programs, satellite information, local channel information, etc.

Network connections 252 are configured to communicate with other computing devices, such as local content-receiver-and-distribution device 128, or other devices not illustrated in this figure, such as information providers 106 and content providers 104. In various embodiments, the network connections 252 include transmitters and receivers (not illustrated) to send and receive data as described herein. I/O interfaces 248 may include a keyboard, audio interfaces, video interfaces, or the like. Other computer-readable media 250 may include other types of stationary or removable computer-readable media, such as removable flash drives, external hard drives, or the like.

Local content-receiver-and-distribution device 128 receives encoding metadata from remote content distributor 102 and content from remote content distributor 102 or local content distributor 122. One or more special-purpose computing systems may be used to implement local content-receiver-and-distribution device 128. Accordingly, various embodiments described herein may be implemented in software, hardware, firmware, or in some combination thereof. local content-receiver-and-distribution device 128 may include memory 202, one or more central processing units (CPUs) 214, display interface 216, I/O interfaces 218, other computer-readable media 220, and network connections 222.

Memory 202 may include one or more various types of non-volatile and/or volatile storage technologies, similar to what is described above for memory 230. Memory 202 may be utilized to store information, including computer-readable instructions that are utilized by CPU 214 to perform actions, including embodiments described herein. In some embodiments, memory 202 may have stored thereon content encoding system 204, which includes encoding module 206 and encoding metadata 208. The encoding metadata 208 temporarily stores encoding content received from the remote content distributor 102. And the encoding module 206 utilizes the encoding metadata 208 to encode content received by the local content-receiver-and-distribution device 128 to be provided to other computing devices not illustrated in this figure, such as content receivers 130 or mobile computing device 140 in FIG. 1. Memory 202 may also store other programs and data 210, which may include other programs, local channel information, received content prior to encoding, etc.

Display interface 216 is configured to provide content to a display device, such as display device 136 in FIG. 1, for presentation of the content to a viewer. I/O interfaces 218 may include a keyboard, audio interfaces, other video interfaces, or the like. Network connections 222 are configured to communicate with other computing devices, such as remote content distributor 102 or other computing devices not illustrated in this figure, such as content receivers 130 or mobile computing device 140 in FIG. 1. In various embodiments, the network connections 222 include transmitters and receivers (not illustrated) to send and receive data as described herein. Other computer-readable media 220 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a satellite antenna that receives a spot beam signal having encoded content specific for geographical area and having encoding metadata that indicates how original content was encoded into the encoded content;
an over-the-air antenna that receives over-the-air signals that include over-the-air content; and
a local content-receiver-and-distribution device that includes:
spot-beam-replacement circuitry that:
receives, via the over-the-air antenna, the over-the-air signals that include the over-the-air content, wherein the over-the-air content is the same as the original content;
receives, via the satellite antenna, the spot beam signal;
extracts the encoding metadata from the spot beam signal;
encodes the over-the-air content using the extracted encoding metadata; and
generates a replacement spot beam signal with the encoded over-the-air content; and
channel-switching-network circuitry that:
provides the replacement spot beam signal to a content receiver, instead of the spot beam signal, for decoding and presenting the over-the-air content to a user.

2. The system of claim 1, wherein the spot-beam-replacement circuitry further:
modulates the encoded over-the-air content with one or more spot beam modulation parameters; and
up-converts the modulated encoded over-the-air content to a transponder frequency of the spot beam signal.

3. The system of claim 1, wherein the channel-switching-network circuitry further:
receives, via the satellite antenna, one or more other orbital signals;
combines the replacement spot beam signal with the one or more other orbital signals prior to providing the replacement spot beam to the content receiver; and
provides the combined replacement spot beam signal and one or more other orbital signals to the content receiver.

4. The system of claim 1, wherein the channel-switching-network circuitry further:
   receives, via the satellite antenna, one or more other orbital signals;
   receives, from the content receiver, a channel request for a channel in the spot beam signal; and
   in response to receiving the channel request for the channel in the spot beam signal, provides the replacement spot beam signal to the content receiver.

5. The system of claim 1, wherein the channel-switching-network circuitry further:
   receives, via the satellite antenna, one or more other orbital signals;
   receives, from the content receiver, a channel request for a channel in a particular orbital signal in the one or more other orbital signals; and
   in response to receiving the channel request for the channel in the particular orbital signal, provides the particular orbital signal from the one or more other orbital signals to the content receiver.

6. The system of claim 1, wherein the channel-switching-network circuitry further:
   provides the extracted encoding metadata to the content receiver.

7. The system of claim 1, wherein the spot-beam-replacement circuitry further:
   analyzes the spot beam signal to determine one or more local channels that are expected to be included in the spot beam signal;
   analyzes the received over-the-air signals to determine which of the one or more expected local channels are available in the over-the-air signals;
   extracts the available channels from the over-the-air signals; and
   encodes the extracted available channels based on the extracted encoding metadata.

8. The system of claim 1, further comprising:
   a content distributor that includes:
      a memory that stores computer instructions; and a processor that executes the computer instructions to perform actions, the actions including:
         receiving the original content for distribution to a plurality of content receivers;
         encoding the content;
         determining the encoding metadata based on the encoding of the original content; and
         generating the spot beam signal to include the encoded content and the encoding metadata.

9. A method, comprising:
   receiving, via an over-the-air antenna, over-the-air signals that include over-the-air content;
   receiving, via a satellite antenna, a spot beam signal having encoded content specific for geographical area and having encoding metadata that indicates how original content was encoded into the encoded content, wherein the over-the-air content is the same as the original content;
   extracting the encoding metadata from the spot beam signal;
   encoding the over-the-air content using the extracted encoding metadata;
   generating a replacement spot beam signal with the encoded over-the-air content; and
   providing the replacement spot beam signal to a content receiver for decoding and presenting the over-the-air content to a user.

10. The method of claim 9, wherein generating the replacement spot beam signal further comprises:
    modulating the encoded over-the-air content with one or more spot beam modulation parameters; and
    up-converting the modulated encoded over-the-air content to a transponder frequency of the spot beam signal.

11. The method of claim 9, further comprising:
    receiving, via the satellite antenna, one or more other orbital signals;
    combining the replacement spot beam signal with the one or more other orbital signals prior to providing the replacement spot beam to the content receiver; and
    proving the combined replacement spot beam signal and one or more other orbital signals to the content receiver.

12. The method of claim 9, further comprising:
    receiving, via the satellite antenna, one or more other orbital signals;
    receiving, from the content receiver, a channel request for a channel in the spot beam signal; and
    in response to receiving the channel request for the channel in the spot beam signal, providing the replacement spot beam signal to the content receiver.

13. The method of claim 9, further comprising:
    receiving, via the satellite antenna, one or more other orbital signals;
    receiving, from the content receiver, a channel request for a channel in a particular orbital signal in the one or more other orbital signals; and
    in response to receiving the channel request for the channel in the particular orbital signal, providing the particular orbital signal from the one or more other orbital signals to the content receiver.

14. The method of claim 9, further comprising:
    providing the extracted encoding metadata to the content receiver.

15. The method of claim 9, wherein encoding the over-the-air content further comprises:
    analyzing the spot beam signal to determine one or more local channels that are expected to be included in the spot beam signal;
    analyzing the received over-the-air signals to determine which of the one or more expected local channels are available in the over-the-air signals;
    extracting the available channels from the over-the-air signals; and
    encoding the extracted available channels based on the extracted encoding metadata.

16. A non-transitory computer-readable medium having stored contents that, when executed by a processor of a computing system, cause the computing system to:
    receive, via an over-the-air antenna, over-the-air signals that include over-the-air content;
    receive, via a satellite antenna, a spot beam signal having encoded content specific for geographical area and having encoding metadata that indicates how original content was encoded into the encoded content, wherein the over-the-air content is the same as the original content;
    extract the encoding metadata from the spot beam signal;
    encode the over-the-air content using the extracted encoding metadata;
    generate a replacement spot beam signal with the encoded over-the-air content; and
    provide the replacement spot beam signal to a content receiver for decoding and presenting the over-the-air content to a user.

17. The non-transitory computer-readable medium of claim 16, wherein executing the stored contents by the processor of the computing system further causes the computing system to:
- receive, via the satellite antenna, one or more other orbital signals;
- combine the replacement spot beam signal with the one or more other orbital signals prior to providing the replacement spot beam to the content receiver; and
- provide the combined replacement spot beam signal and one or more other orbital signals to the content receiver.

18. The non-transitory computer-readable medium of claim 16, wherein executing the stored contents by the processor of the computing system further causes the computing system to:
- receive, via the satellite antenna, one or more other orbital signals;
- receive, from the content receiver, a channel request for a channel in the spot beam signal; and
- in response to receiving the channel request for the channel in the spot beam signal, provide the replacement spot beam signal to the content receiver.

19. The non-transitory computer-readable medium of claim 16, wherein executing the stored contents by the processor of the computing system further causes the computing system to:
- receive, via the satellite antenna, one or more other orbital signals;
- receive, from the content receiver, a channel request for a channel in a particular orbital signal in the one or more other orbital signals; and
- in response to receiving the channel request for the channel in the particular orbital signal, provide the particular orbital signal from the one or more other orbital signals to the content receiver.

20. The non-transitory computer-readable medium of claim 16, wherein executing the stored contents by the processor of the computing system further causes the computing system to:
- provide the extracted encoding metadata to the content receiver.

* * * * *